United States Patent [19]

Beakes et al.

[11] Patent Number: 5,413,403
[45] Date of Patent: May 9, 1995

[54] LEAD PULL ASSEMBLY

[75] Inventors: John M. Beakes, Fairborn; James G. Stelzer, Springfield, both of Ohio

[73] Assignee: Globe Products Inc., Huber Heights, Ohio

[21] Appl. No.: 104,209

[22] Filed: Aug. 9, 1993

[51] Int. Cl.[6] .................. B66C 1/62; B25J 15/00
[52] U.S. Cl. ..................... 294/88; 294/907; 901/37; 901/46
[58] Field of Search ............ 294/88, 103.1, 907; 901/37, 46; 92/130 R, 130 C, 133

[56] References Cited

U.S. PATENT DOCUMENTS

| | | | |
|---|---|---|---|
| 3,824,901 | 7/1974 | Shafer | 92/130 C X |
| 3,943,830 | 3/1976 | Sugiura | 92/133 X |
| 4,074,418 | 2/1978 | Pearsall . | |
| 4,204,456 | 5/1980 | Ward | 294/88 X |
| 4,348,044 | 9/1982 | Wood, III | 901/37 X |
| 4,529,182 | 7/1985 | Valentine | 294/88 |
| 4,951,379 | 8/1990 | Clemenz . | |
| 5,022,695 | 6/1991 | Ayers | 294/88 |
| 5,186,405 | 2/1993 | Beakes et al. . | |
| 5,295,723 | 3/1994 | Kronseder | 294/88 |

FOREIGN PATENT DOCUMENTS

| | | | |
|---|---|---|---|
| 152299 | 3/1962 | U.S.S.R. | 294/88 |
| 1366390 | 1/1988 | U.S.S.R. | 901/37 |

OTHER PUBLICATIONS

Front and Back Cover, pp. 153 and 154 of the Reid Tool Supply Company Catalog, Published by Reid Tool Supply Company in 1990.

Primary Examiner—Dean J. Kramer
Attorney, Agent, or Firm—Roger S. Dybvig

[57] ABSTRACT

For use in winding stator coils using fine wire, a lead pull assembly having two wire clamping jaws, one of which is air-driven by a clamping cylinder, is provided with a spring-biased plunger assembly that biases the air-driven clamping jaw to a slightly open position when air pressure is removed from the clamping cylinder to ensure that the clamping jaws can slide along the wire segment between the clamping jaws.

12 Claims, 1 Drawing Sheet

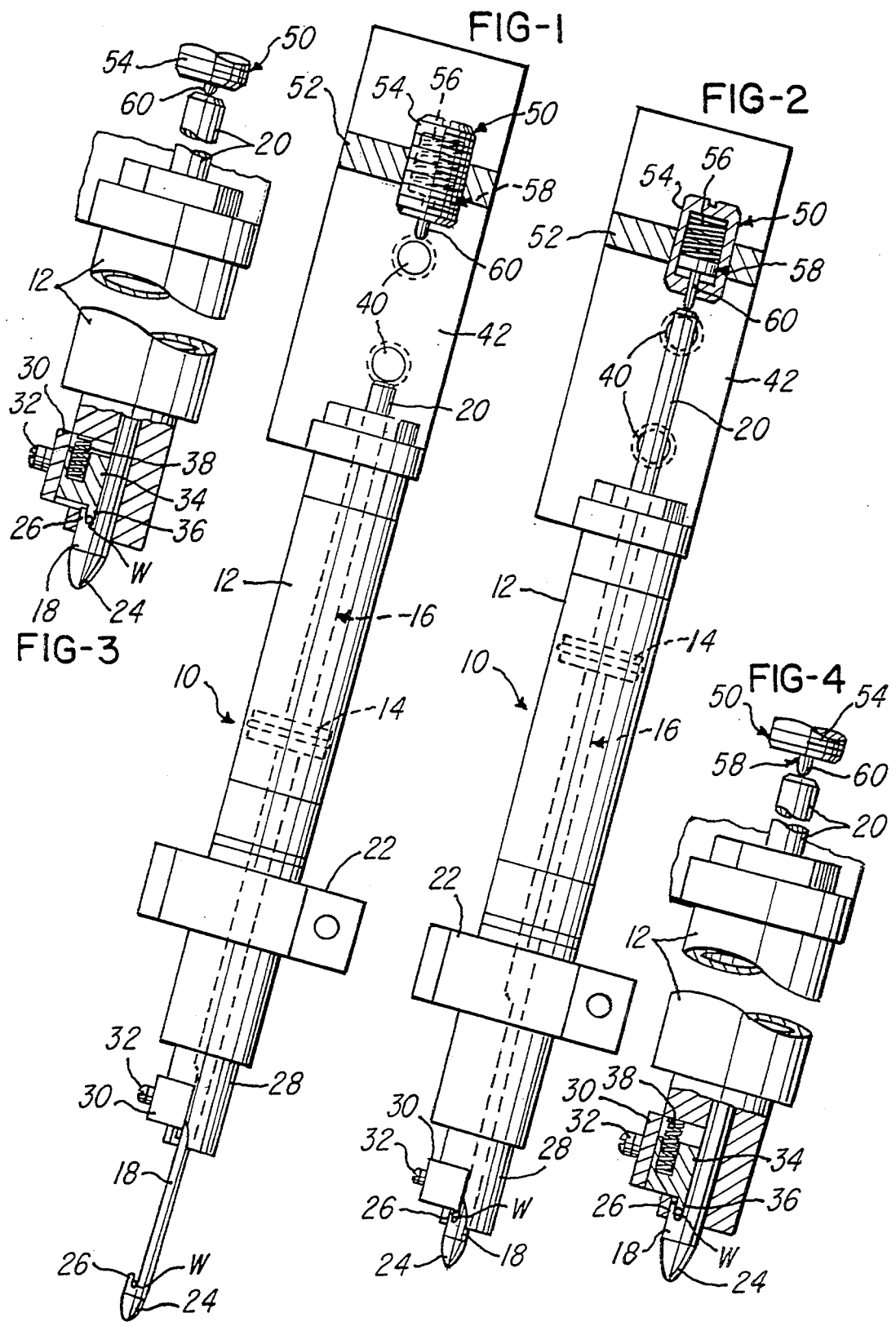

LEAD PULL ASSEMBLY

FIELD OF THE INVENTION

This invention relates to a lead pull assembly for a stator winding machine and, in particular, to a lead pull assembly which successively engages, clamps and cuts a strand of wire between a wound stator coil and a stator winding shuttle used to wind the stator coil.

BACKGROUND OF THE INVENTION

Various lead pull assemblies are known in the prior art. One such assembly, called a lead pull, cut and hold device 162, is illustrated in Pearsall U.S. Pat. No. 4,074,418. In the Pearsall '418 patent, the device 162 is used in a process for securing stator coil lead wires into terminal members mounted on stator cores. Lead pull assemblies are often used to connect the lead wires leading to and from stator coils into wire clamps that temporarily grip the lead wires in preparation for later processing steps during which the lead wires are permanently affixed to coil terminals. See, for example, FIGS. 17 through 22 of Beakes et al. U.S. Pat. No. 5,186,405. FIG. 1 of Clemenz U.S. Pat. No. 4,951,379, shows stator coil lead wires temporarily connected to wire clamps 46. The disclosures of the aforementioned U.S. Pat. Nos. 4,074,418; 4,951,379; and 5,186,405, are hereby incorporated by reference herein.

It is sometimes necessary to move the lead pull assemblies with the clamping pressures on the wire leads relaxed to enable the lead wires to slide relative to the lead pull assemblies so that the lead wires are not removed from the temporary wire clamps. This has not been a problem with heavier wires. The air pressure used to create the clamping pressure is simply released whereupon the lead pull assemblies can be moved while the lead pull clamp jaws slide along the clamped wire segments. However, the problem has arisen, especially when a lead pull assembly is used with fine wires, that the internal frictional resistance of the lead pull operating cylinder prevents a full release of the clamping pressure and the fine wires are broken as the lead pull assemblies are moved. After repeated operations of such a lead pull assembly, the small pieces of broken lead wire segments may build up on the air-driven lead pull clamp jaw and interfere with proper operation of the lead pull assembly. This problem could be solved by the use of an additional air actuator or by the provision of more elaborate controls for the clamping cylinder, but such solutions would be costly and the need exists for a simple solution to this problem.

SUMMARY OF THE INVENTION

In accordance with this invention, bias means is provided to bias the air-driven clamping jaw to a slightly open position. In the presently preferred embodiment of this invention, and as will become further apparent from the detailed description below, the bias means comprises a commercially-available spring plunger that engages the piston rod assembly of the clamping cylinder when the air-driven clamping jaw is retracted to grip a coil lead wire.

Other objects and advantages will become apparent from the following description and the drawings.

BRIEF DESCRIPTION OF THE DRAWINGS

FIG. 1 is a side elevational view, with parts in cross-section, of a lead pull assembly in accordance with this invention and showing an air-driven clamp jaw extended to pick up a wire lead.

FIG. 2 is a side elevational view, with parts in cross-section, of the lead pull assembly of FIG. 1 showing the air-driven clamp jaw retracted to clamp and sever the wire lead.

FIG. 3 is a fragmentary, side elevational view, with parts in cross-section, of the lead pull assembly of FIG. 1 showing details of the clamp jaws in the same positions as the positions thereof illustrated in FIG. 2.

FIG. 4 is a fragmentary, side elevational view, with parts in cross-section, similar to FIG. 4, but with the air-driven clamp jaw partly extended in accordance with this invention.

DETAILED DESCRIPTION

With reference to the drawings, this invention is shown incorporated in a lead pull assembly, generally designated 10, having a double-acting, pneumatic or air operated clamping cylinder 12 having a piston 14 connected to a piston rod assembly, generally designated 16, having a lower, first end portion 18 extending below the cylinder 12 and an upper, second end portion 20 extending above the cylinder 12. Cylinder 12 is mounted by a clamp 22 to a movable part (not shown) of the stator winding machine of which the lead pull assembly 10 of this invention is a part.

The lower end of the lower, first end portion 18 of the piston rod assembly 16 terminates in a conical nosepiece 24 and an upwardly-facing, U-shaped, hook-like, lower clamping jaw 26. An end fitting 28 connected, as by screw threads (not shown), to the lower end of the cylinder 12, has a central bore through which the lower end portion 18 of the piston rod 16 extends. End fitting 28 cooperates with a retaining bracket 30 connected thereto as by bolts 32 to retain an upper clamping piece 34 having a downwardly-projecting, upper clamping jaw 36 aligned with the bight of the lower clamping jaw 26. The upper clamping piece 34 is downwardly biased by a coil spring 38.

In ordinary operation of the particular lead pull assembly 10 illustrated in the drawing, the air cylinder 12 is operated to extend the nosepiece 24 into engagement with and past a stretch of wire W extending between a stator winding shuttle (not shown) and a wound coil (not shown) as a result of which the stretch of wire cams over the nosepiece 24 and snaps into the lower clamping jaw 26, as illustrated in FIG. 1. At this time, the upper end portion 20 of the piston rod assembly 16 is lowered as shown in FIG. 1 so as not to be aligned with either one of two proximity switches 40 mounted on a switch mounting plate 42 fixedly connected to the air cylinder 12. The proximity switches 40 are used conventionally to signal that the piston rod assembly 16 has reached the lower end of its travel. Immediately thereafter, the air cylinder 12 is operated to retract the lower clamping jaw 26, as shown in FIGS. 2 and 3. During such retraction, the wire segment W is clamped between the two clamping jaws 26 and 36. Upon continued retraction of the lower end 18 of the piston rod assembly 16, the stretch of wire W leading from the freshly-wound stator coil to the part that is thus clamped is severed against a cutting edge formed by a sharpened edge of the end fitting 28. At the end of the upward movement of the piston 16, which is illustrated in FIGS. 2 and 3, the upper end portion 20 of the piston rod assembly 16 is aligned with both proximity switches 40, which signal that the piston rod assembly 16 has reached the upper limit of its travel. The lead pull assembly 10 may then be moved as necessary to move the clamped wire segment W into a temporary clamp. In typical operations, the wire segment leading from the lead pull assembly 10 to the winding shuttle ordinarily remains clamped to the lead pull assembly until after the winding shuttle is operated to begin the winding of a coil on the next stator to be wound.

The lead pull assembly 10 and its operation as thus far described are entirely conventional. If there is a need to move the lead pull assembly 10 after the wire segment W is inserted into a wire clamp without fully extending the lower end 18 of the piston rod assembly 16 into the position thereof illustrated in FIG. 1, such as to enable the lead pull assembly 10 to be moved to avoid interference with the movements of other parts of the stator winding machine without completely releasing the wire segment W, the practice is to release the air pressure applied to the cylinder 12 to thereby release the clamping pressure applied to the wire segment W gripped by the clamping jaws 26 and 36 without fully releasing the wire segment W. This enables the wire segment W to slide relative to the clamping jaws 16 and 36. Such practice is successful in most cases, but in cases in which stators are being wound from fine wires, the internal friction in the clamping air cylinders is so great that the fine wires remain held sufficiently tightly clamped that they break near the clamping jaws 26 and 36, leaving a remnant wire piece lodged in the lower jaw 26. Following repeated clamping operations, the remnant pieces of wire could build up on the lower jaw 26 to the extent that they interfere with the proper operation of the lead pull assembly, with the result that some of the stators would have to be rejected and the winding machine shut down to enable removal of the wire pieces accumulated on the lower jaw 26.

The foregoing problem is overcome in accordance with this invention as follows. As shown in FIGS. 1 and 2, a spring plunger assembly, generally designated 50, is mounted on a bracket 52 fixedly supported on the switch mounting plate 42. The spring plunger assembly 50, which is readily commercially available, includes an externally-threaded, hollow, cylindrical housing 54 within which a coil spring 56 is confined that biases a piston-like plunger 58 downwardly. Plunger 58 includes a downwardly-extending plunger rod 60 that extends through a bore in the bottom of the plunger housing 54 in alignment with the piston rod assembly 16. In operation, when the piston 14 is retracted upwardly as when in FIG. 2, the plunger spring 58 is collapsed by operation of the air cylinder 12. Thereafter, when the air pressure is removed from the air cylinder 12, the plunger rod 68 drives the piston rod assembly 16 downwardly which causes the lower clamping jaw 26 to lower away from the upper clamping jaw 36, as shown in FIG. 4, so that the jaws 26 and 36 may slide along the wire segment W. Because the spring plunger assembly 50 has an externally threaded housing 54, it is possible by rotating the housing 54 relative to its mounting bracket 58 to axially move the plunger assembly 50 relative to the air cylinder 12, thereby to quickly and accurately adjust the pressure exerted by the spring plunger rod 60 upon the piston rod assembly 16 when the air pressure on the clamping cylinder 12 is released.

Although the presently preferred embodiment of this invention has been described, it will be understood that within the purview of the invention various changes may be made within the scope of the following claims.

Having thus described our invention, we claim:

1. In a lead pull assembly having a hook-like, U-shaped clamp jaw adapted to engage a strand of wire, a spring-biased jaw facing the bight of said U-shaped jaw, and a double acting pneumatic cylinder having a piston rod assembly including a first end portion projecting from one end of said cylinder to which said U-shaped jaw is connected that drives said U-shaped jaw from an extended position in which said U-shaped jaw is spaced from said spring-biased jaw to a retracted position in which said U-shaped jaw is drawn toward said spring-biased jaw to hold a strand of wire between said jaws, said lead pull assembly being movable to provide clearance for movements of associated apparatus, said piston rod assembly having a second end portion projecting from the opposite end of said cylinder, the improvement wherein a bias mechanism having a biasing member positioned remotely from said cylinder and engageable with said second end of said piston rod only when said U-shaped jaw approaches its fully retracted position biases said piston rod assembly to move in a direction and through a distance to ensure that, when air pressure is removed from said cylinder to release the clamping pressure exerted by said cylinder on said piston rod assembly, said jaws are slightly open so that the clamping pressure exerted by said jaws on a strand of wire therebetween is released to enable the wire to slide relative to said jaws.

2. The improvement of claim 1 wherein said second end portion of said piston rod assembly causes the opening and closing of at least one position-sensing proximity switch mounted on a switch mounting plate affixed to said cylinder, and wherein said bias mechanism is mounted on said switch mounting plate in spaced relation to said cylinder.

3. The improvement of claim 2 wherein said bias means comprises a spring-biased plunger assembly.

4. The improvement of claim 1 wherein said bias mechanism comprises a spring-biased plunger assembly.

5. The improvement of claim 4 wherein said spring-biased plunger assembly includes an externally-threaded spring housing threadedly mounted on said switch mounting plate.

6. In a lead pull assembly having a hook-like, U-shaped clamp jaw adapted to engage a strand of wire, a spring-biased jaw facing the bight of said U-shaped jaw, and a double acting pneumatic cylinder having a piston rod assembly including a first end portion projecting from one end of said cylinder to which said U-shaped jaw is connected that drives said U-shaped jaw from an extended position in which said U-shaped jaw is spaced from said spring-biased jaw to a retracted position in which said U-shaped jaw is drawn toward said spring-biased jaw to hold a strand of wire between said jaws, said clamp assembly being movable to provide clearance for movements of associated apparatus, said piston rod assembly having a second end portion projecting from the opposite end of said cylinder, said second end portion of said piston rod assembly causes the opening and closing of at least one position-sensing proximity switch mounted on a switch mounting plate affixed to said cylinder, the improvement wherein a spring-biased plunger assembly mounted on said switch mounting plate in spaced relation to said cylinder and positioned in the path of movement of said second piston rod member biases said piston rod assembly in a direction to release the clamping pressure exerted by said jaws on a strand of wire therebetween when air pressure is removed from said cylinder, said spring biased plunger assembly including an externally-threaded spring housing threadedly mounted on said switch mounting plate.

7. In a lead pull assembly having a first clamp jaw adapted to engage a strand of wire, a spring-biased second jaw facing said first jaw, and a double acting pneumatic cylinder having a piston rod assembly including a first end portion projecting from one end of said cylinder to which said first jaw is connected that drives said first jaw from an extended position in which said first jaw is spaced from said second jaw to a retracted position in which said first jaw is drawn toward said second jaw to hold a strand of wire between said jaws, said piston rod assembly having a second end portion projecting from the opposite end of said cylinder, the improvement wherein a bias mechanism having a biasing member positioned remotely from said cylinder and engageable with said second end of said piston rod only when said first jaw approaches its fully retracted position biases said piston rod assembly to move in a direction and through a distance to ensure that, when air pressure is removed from said cylinder to release the clamping pressure exerted by said cylinder on said piston rod assembly, said jaws are slightly open so that the clamping pressure exerted by said jaws on a strand of wire therebetween is released to enable the wire to slide relative to said jaws.

8. The improvement of claim 7 wherein said bias mechanism comprises a spring-biased plunger assembly.

9. The improvement of claim 8 wherein said spring-biased plunger assembly includes an externally-threaded spring housing threadedly mounted in spaced relation to said cylinder.

10. The improvement of claim 7 wherein said second end portion of said piston rod assembly causes the opening and closing of at least one position-sensing proximity switch mounted on a switch mounting plate affixed to said cylinder, and wherein said bias mechanism is mounted on said switch mounting plate in spaced relation to said cylinder.

11. The improvement of claim 10 wherein said bias mechanism comprises a spring-biased plunger assembly.

12. The improvement of claim 11 wherein said spring-biased plunger assembly includes an externally-threaded spring housing threadedly mounted on said switch mounting plate.

* * * * *